3,642,826
Patented Feb. 15, 1972

3,642,826
3-OXO-A,19-BIS-NOR-HOMO-STEROID-5(10)-ENES AND PROCESS FOR THEIR MANUFACTURE
Georg Anner and Jaroslav Kalvoda, Basel, Switzerland, assignors to Ciba Corporation, Summit, N.J.
No Drawing. Filed Nov. 26, 1968, Ser. No. 779,259
Claims priority, application Switzerland, Dec. 18, 1967, 17,732/67
Int. Cl. C07d *13/04*
U.S. Cl. 260—340.9       9 Claims

ABSTRACT OF THE DISCLOSURE

Steroid compounds of the partial formula

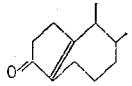

especially of the androstane series. They are obtained by reacting a compound of the partial formula

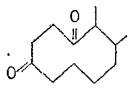

or a tautomer thereof with a strong base. Use: anabolics or ovulation inhibitors.

---

The present invention provides new 3-oxo-A,19-bis-nor - B - homosteroid-5(10)-enes, especially 3-oxo-A,19-bis-nor-B-homo-androsta-5(10)-enes, in the first place 3-oxo-A-nor-B-homo-oestra-5(10)-enes of the general formula

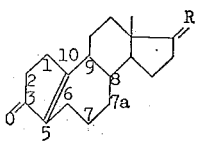

in which R represents a free or ketalized oxo group or a β-positioned, free, esterified or etherified hydroxyl group together with a hydrogen atom or with a lower aliphatic, saturated or unsaturated hydrocarbon radical, and a process for their manufacture.

An esterified hydroxyl group is more especially a hydroxyl group esterified with an aliphatic, alicyclic, araliphatic or aromatic carboxylic acid containing at most 20 carbon atoms, for example with formic, methylcarbonic, acetic, trifluoroacetic, trimethylacetic, propionic, caproic, decanoic, undecylenic, hexahydrobenzoic, cyclopentylpropionic, phenylpropionic, benzoic or furancarboxylic acid. An etherified hydroxyl group is in the first place a hydroxyl group etherified with an aliphatic, cycloaliphatic, araliphatic or heterocyclic alcohol, such as a tetrahydrofuranyl or -pyranyl alcohol.

Suitable lower saturated or unsaturated aliphatic radicals are, for example, lower alkyl such as methyl, ethyl, propyl or isopropyl groups, or lower alkenyl such as vinyl, allyl or methallyl groups, or lower alkinyl such as ethinyl or propinyl radicals. The term "lower" referring above and below to hydrocarbon radicals defines those radicals which contain at most 5 chain carbon atoms.

The new compounds are distinguished by their androgenic, anabolic and antigonadotropic effects and may therefore be used as anabolics or ovulation inhibitors. They are also valuable intermediates for the manufacture of other A-nor-B-homosteroids by known chemical and/or microbiological methods.

Especially valuable are those compounds of the above formula, in which R is a free keto group or a hydroxyl group together with a hydrogen atom or with a methyl or ethinyl group, and their esters with aliphatic, especially lower aliphatic carboxylic acids, such as their acetates.

The new 3 - oxo - A,19-bis-nor-B-homosteriod-5(10)-enes are obtained when a 3,10-dioxo-5,10-secosteroid, especially one of the general formula

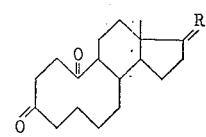

in which R has the above meaning or a tautomer thereof is reacted with a strong base and, if desired a ketalized oxo group in a resulting compound is liberated and/or an esterified or etherified hydroxyl group is hydrolyzed and/or a 17-oxo group present is reduced, possibly accompanied by introduction of a lower aliphatic, saturated or unsaturated hydrocarbon radical, and/or a free hydroxyl group in a resulting compound is esterified or etherified.

As the strong base any desired strong inorganic base may be used, such as an alkali metal hydroxide, e.g. sodium hydroxide, potassium hydroxide or lithium hydroxide, or an alkali metal alcoholate, e.g. potassium tertiary butylate or sodium methylate or ethylate, or a strong organic base, such as a linear or cyclic tertiary or secondary amine, e.g. trimethylamine, triethylamine or piperidine.

If desired, esterified or etherified hydroxyl groups or ketalized oxo groups present in a resulting process product may be split hydrolytically. A free oxo group in position 17 can be selectively reduced to the 17-hydroxyl group by reduction, e.g. with a complex light-metal hydride, especially an alkali metal borohydride or lithium tri-tertiary butoxy-aluminum hydride; it is also possible to reduce it to a 17α-substituted 17β-hydroxy compound by means of a metal derivative, especially a Grignard compound or an alkali metal derivative such as lithium or sodium derivative of a lower aliphatic compound. A free hydroxyl group may be esterified or etherified in the usual manner, especially with the aforementioned acids, or with their anhydrides or halides or with the alcohols mentioned above.

The starting materials to be used in the present invention are known or, insofar as they are new, they may be prepared by known methods, e.g. by fragmentation of 6-tosylhydrazones of 3,6-dioxo-5,10-epoxysteroids, accompanied by elimination of nitrogen, and reduction of the 5,6-double bond thus formed.

The invention includes also any variant of the process in which a starting material is formed under the reaction conditions or is used in the form of a salt or derivative thereof, or in which an intermediate obtained at any stage of the process is used as starting material and the remaining step/steps is/are carried out.

The new compounds may be used, for example, in the form of pharmaceutical preparations containing them in the free form or, if desired, in the form of their salts, in conjunction or admixture with an organic or inorganic, solid or liquid pharmaceutical excipient suitable for enteral or parenteral administration. Suitable excipients are substances that do not react with the new compounds e.g. water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be e.g. tablets, dragees or capsules, or in liquid form solutions, suspensions or emulsions. They may be sterilized and/or may contain assistants, such as preserving, stabilizing, wetting or emulsifying agents, solubilizers, salts for regulating the osmotic pressure or buffers. They may also contain further therapeutically valuable substances. The pharmaceutical preparations are formulated by the usual methods.

The new compounds may also be used in the form of animal feedstuffs or additives to feedstuffs, using e.g. the conventional extenders or diluents or feedstuffs respectively.

The following examples illustrate the invention without restricting its scope in any way.

EXAMPLE 1

2.18 grams of 3,10,17-trioxo-5,10-seco-oestrane are dissolved in 30 ml. of methanol with slight heating, then mixed with 950 mg. of potassium tertiary butylate and kept for 2 hours at room temperature. The colorless solution is diluted with water and a 1:4-mixture of methylenechloride+ether, the organic phase separated and washed three times with water. The washings are further extracted three times with methylenechloride+ether, the organic solutions are dried and evaporated under a water-jet vacuum. The resulting crude 3,17-dioxo-A-nor-B-homo-oestr-5(10)-ene (2.1 g.) is recrystallized from ether+petroleum ether. The pure compound melts at 107–109° C. $[\alpha]_D^{20} = +71°$ (c.=0.924). Infrared spectrum: bands inter alia at 5.76, 5.92, 6.14, 9.50 and 12.15$\mu$. Ultraviolet spectrum: $\lambda_{max.} = 244$ m$\mu$ ($\epsilon = 14,800$).

The starting material used above may be prepared e.g. as follows:

A solution of 12.38 g. of 3,3-ethylenedioxy-10,17-dioxo-5,10-seco-oestr-5-ine in 1.2 liters of alcohol is hydrogenated in the presence of 6.0 g. of 10% palladium-calcium carbonate as catalyst. After about 30 minutes another 3.0 g. of catalyst are added. After 1415 ml. of hydrogen (=2 equivalents) have been absorbed, the hydrogenation is discontinued, the solution filtered off the catalyst, mixed with 1 ml. of pyridine and evaporated under a water-jet vacuum. The resulting colorless residue is recrystallized from methylenechloride+ether, to yield 11.45 g. of pure 3,3-ethylenedioxy-10,17-dioxo-5,10-seco-oestrane melting at 161–162° C. $[\alpha]_D^{20} = +54°$ (c.=0.970).

A solution of 11.45 g. of 3,3-ethylenedioxy-10,17-dioxo-5,10-seco-oestrane in 160 ml. of 50% acetic acid is heated to 90° C. and within 3 minutes 80 ml. of water heated at 70° C. are added. The batch is stirred on for 15 minutes, then poured into about 1.5 liters of ice water saturated with sodium chloride, stirred for 20 minutes, and the precipitate formed is suctioned off, washed with water and dried. The residue is dissolved in methylenechloride, the solution dried with sodium sulfate, mixed with ether and concentrated under vacuum. Suctioning furnishes 6.46 g. of pure 3,10,17-trioxo-5,10-seco-oestrane melting at 159–161° C. On further concentration another 2.18 g. of the same product of identical melting point are obtained.

EXAMPLE 2

A solution of 2.0 g. of 3,17-dioxo-A-nor-B-homo-oestr-5(10)-ene [obtained as described in Example 1] in 20 ml. of tetrahydrofuran is stirred dropwise within 2 minutes into a suspension of 4.0 g. of lithium tri-tertiary butoxy-aluminum hydride in 40 ml. of absolute tetrahydrofuran; flushing with 20 ml. of tetrahydrofuran is performed and the whole is stirred on for 2 hours at room temperature, then stirred into ice water containing 4.0 g. of ammonium chloride and extracted 3 times with methylene chloride. The organic extracts are washed successively with water, ice-cold 2 N hydrochloric acid, water, cold saturated sodium bicarbonate solution and once more with water, dried and evaporated under a water-jet vacuum. Crystallization of the crude product from methylenechloride+ether furnishes pure 3-oxo-17$\beta$-hydroxy-A-nor-B-homo-oestr-5(10)-ene melting at 125–126° C.

EXAMPLE 3

A suspension of 2.0 g. of lithium acetylide+trimethylamine complex in 5 ml. of toluene and 10 ml. of freshly distilled dimethylsulfoxide is mixed with a solution of 1.0 g. of 3,17-dioxo-A-nor-B-homo-oestr-5(10)-ene [prepared as described in Example 1]. The reaction mixture is stirred for 8 hours at room temperature, then cooled to about 10° C., cautiously mixed with a solution of 4.5 g. of ammonium chloride in 15 ml. of water, diluted with water and extracted twice with a 1:4-mixture of methylenechloride+ether. The organic phases are washed with saturated ammonium chloride solution and then with water, dried and evaporated under a water-jet vacuum. The resulting crude product, which still contains some starting material, is once more reacted with the lithium acetylide complex as described above. Renewed working up furnishes a brownish crude product which on chromatography on silicagel followed by crystallization from ether furnishes the pure 3-oxo-17$\beta$-hydroxy-17$\alpha$-ethinyl-A-nor-B-homo-oestr-5(10)-ene, melting at 152–154° C.

EXAMPLE 4

A solution of 380 mg. of 3-oxo-17$\beta$-hydroxy-A-nor-B-homo-oestr-5(10)-ene [obtained as described in Example 2] in 2 ml. of pyridine and 2 ml. of acetic anhydride is kept for 15 hours at room temperature. The yellowish reaction mixture is poured into ice water, stirred for 1 hour and then twice extracted with ether. The organic phases are successively washed with water, 2 N hydrochloric acid, water, saturated sodium bicarbonate solution and water, dried and evaporated under a water-jet vacuum. Crystallization of the resulting crude product from methylenechloride+ether+petroleum ether furnishes pure 3-oxo-17$\beta$-acetoxy-A-nor-B-homo-oestr-5(10)-ene melting at 115° C.

EXAMPLE 5

A solution of 2.0 g. of crude 3,10-dioxo-17$\beta$-hydroxy-5,10-seco-oestrane in a mixture of 30 ml. of methanol and 10 ml. of tertiary butanol is mixed with 1.45 g. of potassium tertiary butylate and kept for 3 hours at room temperature. The reaction mixture is diluted with water and extracted 3 times with a 1:4-mixture of methylenechloride+ether. The organic extracts are washed with water, dried and evaporated under a water-jet vacuum. Crystallization of the resulting crude product from methylenechloride+ether furnishes pure 3-oxo-17$\beta$-hydroxy-A-nor-B-homo-oestr-5(10)-ene melting at 125–126° C. Infrared spectrum: bands inter alia at 2.80, 2.90, 5.93, 6.15 and 9.80$\mu$.

The compound used as starting material is obtained from 3,3-ethylenedioxy-10,17-dioxo-5,10-seco-oestr-5-ine, e.g. by reduction with sodium borohydride in aqueous methanol, followed by hydrogenation of the triple bond and hydrolysis of the ketal in position 3. The crystalline crude product displays in the infrared spectrum bands, inter alia, at 2.80, 2.88, 5.87, 9.00, 9.25 and 12.30$\mu$, and is used for the further reaction without previous purification.

EXAMPLE 6

A solution of 1.00 g. of 3,10-dioxo-17$\beta$-hydroxy-17$\alpha$-methyl-5,10-seco-oestrane in 20 ml. of ethanol is mixed with 600 mg. of sodium ethylate and stirred for 2 hours under nitrogen. The reaction mixture is poured into ice water and extracted 3 times with a 4:1-mixture of ether+methylenechloride. The extracts are washed neutral, dried and evaporated under a water-jet vacuum, to furnish 980 mg. of a crude product which on chromatography from silicagel and crystallization from methylenechloride+ether of the 9:1-fractions in toluene+ethyl acetate yields pure 3-oxo-17$\beta$-hydroxy-17$\alpha$-methyl-A-nor-B-homo-oestr-5(10)-ene. In the infrared spectrum it displays bands, inter alia, at 2.75, 5.94, 6.15, 7.25, 11.90 and 12.13$\mu$. Ultraviolet spectrum: $\lambda_{max.} = 245$ m$\mu$ ($\epsilon = 14,900$).

The starting material used above is accessible e.g. from the known 3,3,17,17-bisethylenedioxy - 6β - acetoxy-oestr-5(10)-ene by partial hydrolysis of the ketal in position 17, reacting the resulting ketone with methyl magnesium bromide in ether, epoxidation of the Δ$^{5(10)}$-double bond with e.g. metachloroperbenzoic acid, oxidation of the 6β-hydroxyl group with chromic acid in pyridine, reaction with tosylhydrazine in methanol, hydrogenation of the triple bond formed in position 5,6 and hydrolysis of the ketal in position 3. The compound is advantageously cyclized without first having been specially purified.

We claim:
1. Process for the manufacture of

3-oxo-A,19-bis-nor-B-homo-steroid-5(10)-enes wherein a compound of the formula

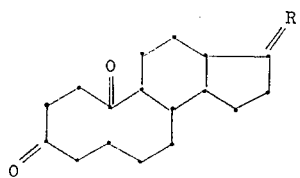

in which R represents a free or ketalized oxo group or a β-positioned, free, esterified or etherified hydroxyl group together with a hydrogen atom or a lower aliphatic, saturated or unsaturated hydrocarbon or a tautomer thereof, said esterified hydroxyl group being derived from a carboxylic acid having up to 20 carbon atoms and each etherified hydroxyl group being derived from an alcohol selected from the group consisting of a lower alkanol, tetrahydrofuranyl and tetrahydropyranyl alcohol is reacted with a strong base.

2. Process according to claim 1, wherein the strong base used is an inorganic base.
3. Process according to claim 1, wherein the strong base used is an organic base.
4. Process according to claim 3, wherein a linear or cyclic, tertiary or secondary amine is used.
5. Process according to claim 1, wherein a 3,10-dioxo-9,10-seco-19-nor-androstane is used as starting material.
6. Process according to claim 1, wherein the starting material is a compound of the formula shown, in which R represents (1) a free or ketalized keto group or (2) a hydroxy group together with a hydrogen atom or a methyl or ethinyl group.
7. Process according to claim 1, wherein 3,10,17-trioxo-5,10-seco-oestrane is used as starting material.
8. Process according to claim 1, wherein 3,10-dioxo-17β-hydroxy-5,10-seco-oestrane is used as starting material.
9. Process according to claim 1, wherein 3,10-dioxo-17β-hydroxy - 17α - methyl-5,10-seco-oestrane is used as starting material.

References Cited
UNITED STATES PATENTS

| | | | |
|---|---|---|---|
| 3,336,336 | 8/1967 | Jeger et al. | 260—340.9 |
| 3,338,969 | 8/1967 | Muller et al. | 260—586 |
| 3,459,791 | 8/1969 | Anner et al. | 260—488 |

ALEX MAZEL, Primary Examiner

J. H. TURNIPSEED, Assistant Examiner

U.S. Cl. X.R.

260—345.9, 347.5, 347.8, 398, 476, 487, 488, 586; 424—278